(12) United States Patent
Anderlind et al.

(10) Patent No.: US 7,995,493 B2
(45) Date of Patent: Aug. 9, 2011

(54) ESTIMATING BANDWIDTH IN COMMUNICATION NETWORKS

(75) Inventors: Erik E. Anderlind, Newton, MA (US); Andrew Richardson, Cambridge (GB)

(73) Assignee: Airvana, Corp., Chelmsford, MA (US)

( * ) Notice: Subject to any disclaimer, the term of this patent is extended or adjusted under 35 U.S.C. 154(b) by 134 days.

(21) Appl. No.: 12/343,445

(22) Filed: Dec. 23, 2008

(65) Prior Publication Data

US 2010/0157825 A1 Jun. 24, 2010

(51) Int. Cl.
*H04J 12/26* (2006.01)
(52) U.S. Cl. ......... 370/252; 370/328; 370/338; 709/224
(58) Field of Classification Search ........................ None
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif | |
| 7,299,278 B2 | 11/2007 | Ch'ng | |
| 7,558,356 B2 | 7/2009 | Pollman et al. | |
| 7,558,588 B2 | 7/2009 | To et al. | |
| 7,603,127 B2 | 10/2009 | Chung et al. | |
| 2002/0196749 A1 | 12/2002 | Eyuboglu et al. | |
| 2003/0100311 A1 | 5/2003 | Chung et al. | |
| 2004/0117149 A1* | 6/2004 | Engbrecht | 702/182 |
| 2005/0081116 A1* | 4/2005 | Bejerano et al. | 714/47 |
| 2005/0129123 A1* | 6/2005 | Xu et al. | 375/240.16 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |

(Continued)

FOREIGN PATENT DOCUMENTS

GB 2452688 3/2009

OTHER PUBLICATIONS

Cheng, Liang et al., "Bandwidth Measurement in xDSL Networks", Center for Advanced Information Processing (CAIP), Rutgers—The State University of New Jersey, Piscataway, New Jersey, 2001 (5 pages).

(Continued)

*Primary Examiner* — Chi H. Pham
*Assistant Examiner* — Shick Hom
(74) *Attorney, Agent, or Firm* — Fish & Richardson P.C.

(57) ABSTRACT

In general, a method includes monitoring, by a personal access point, an amount of backhaul bandwidth available for multimedia and signaling communications by measuring a level of latency associated with existing multimedia and signaling communications.

27 Claims, 6 Drawing Sheets

U.S. PATENT DOCUMENTS

| | | |
|---|---|---|
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0134888 A1 | 6/2008 | Garg et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'Ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'Ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |
| 2009/0296702 A1* | 12/2009 | Stevens et al. ................ 370/389 |
| 2010/0135201 A1* | 6/2010 | Lewis et al. ................... 370/328 |
| 2010/0157825 A1 | 6/2010 | Anderlind et al. ............ 370/252 |

OTHER PUBLICATIONS

Cheng, Liang et al., "Java-based tools for accurate bandwidth measurement of Digital Subscriber Line networks", Department of Electrical and Computer Engineering and Center for Advanced Information Processing (CAIP), Rutgers—The State University of New Jersey, Piscataway, New Jersey, IOS Press, 2002 (4 pages).

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024-A, version 1, Mar. 2004 (1083 pages).

$3^{rd}$ Generation Partnership Project, Technical Specification—Universal Mobile Telecommunications Systems (UMTS); Radio Resource Control (RRC); Protocol Specification, 3GPP TS 25.331 v8.3.0, Release 8, Jul. 2008 (1473 pages).

$3^{rd}$ Generation Partnership Project, Technical Specification—Universal Mobile Telecommunications Systems (UMTS); User Equipment (UE) procedures in idle mode and procedures for cell reselection in connected mode, 3GPP TS 25.304 v7.6.0, Release 7, Jun. 2007 (43 pages).

$3^{rd}$ Generation Partnership Project, Technical Specification—Universal Mobile Telecommunications Systems (UMTS); Requirements for support of radio resource management (FDD), 3GPP TS 25.133 v8.3.0, Release 8, Jun. 2008 (191 pages).

3rd Generation Partnership Project, Technical Specification—Digital cellular telecommunications systems (Phase 2+); Universal Mobile Telecommunications Systems (UMTS); Mobile radio interface Layer 3 specification; Core network protocols; Stage 3, 3GPP TS 24.008 v7.9.0, Release 7, Oct. 2007 (550 pages).

3rd Generation Partnership Project, Technical Specification—Digital cellular telecommunications systems (Phase 2+); Universal Mobile Telecommunications Systems (UMTS); Non-Access-Stratum (NAS) functions related to Mobile Station (MS) in idle mode, 3GPP TS 23.122 v7.9.0, Release 7, Jun. 2007 (37 pages).

* cited by examiner

ESTIMATING BANDWIDTH IN COMMUNICATION NETWORKS

TECHNICAL FIELD

This patent application relates generally to estimating bandwidth in communications networks.

BACKGROUND

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and commonly referred to as "access terminals" ("ATs"). Examples of access terminals include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network.

SUMMARY

In general, in some aspects, a personal access point monitors an amount of backhaul bandwidth available for multimedia and signaling communications by measuring a level of latency associated with existing multimedia and signaling communications.

Aspects can include one or more of the following features. Measuring the level of latency includes transmitting communications by the private access point. The communications include multimedia and signaling packets that are transmitted to a network gateway, and a probe packet that is transmitted immediately after the multimedia and signaling packets, the probe packet being transmitted to a server. The personal access point records or receives both a time at which a first packet in the communications is transmitted, and an amount of bits transmitted in the communications. The server applies a timestamp to the probe packet and transmits the probe packet back to the personal access point. The personal access point calculates the level of latency using the difference between the time at which the first packet in the communications was transmitted, and the time at which the probe packet was timestamped by the server. The personal access point determines an amount of backhaul bandwidth by dividing the amount of bits transmitted in the communications by the level of latency. The personal access point determines an amount of backhaul bandwidth by dividing the total amount of bits transmitted during one or more measurement periods by the aggregate latency over the same measurement periods. The personal access point determines whether to admit new sessions based on the monitored backhaul bandwidth. The personal access point monitors the amount of backhaul bandwidth while supporting active sessions. The personal access point can reduce an amount of low priority communications if the amount of backhaul bandwidth available for high priority communications is less than a predetermined amount. The bandwidth of the backhaul bandwidth is monitored in an upstream or a downstream direction.

In general, in some aspects, a private access point receives quality of service attributes associated with existing multimedia and signaling communications. The private access point determines, based on the received quality of service attributes, whether an amount of available backhaul bandwidth is available to support an additional session.

Aspects can include one or more of the following features. The quality of service attributes include levels of jitter, delay, or packet loss. The quality of service attributes are extracted from real time control protocol reports and compared to predetermined thresholds. The determination is performed in an upstream or downstream direction.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

Like reference symbols in the various drawings indicate like elements.

DETAILED DESCRIPTION OF ILLUSTRATIVE EMBODIMENTS

Figure 1:
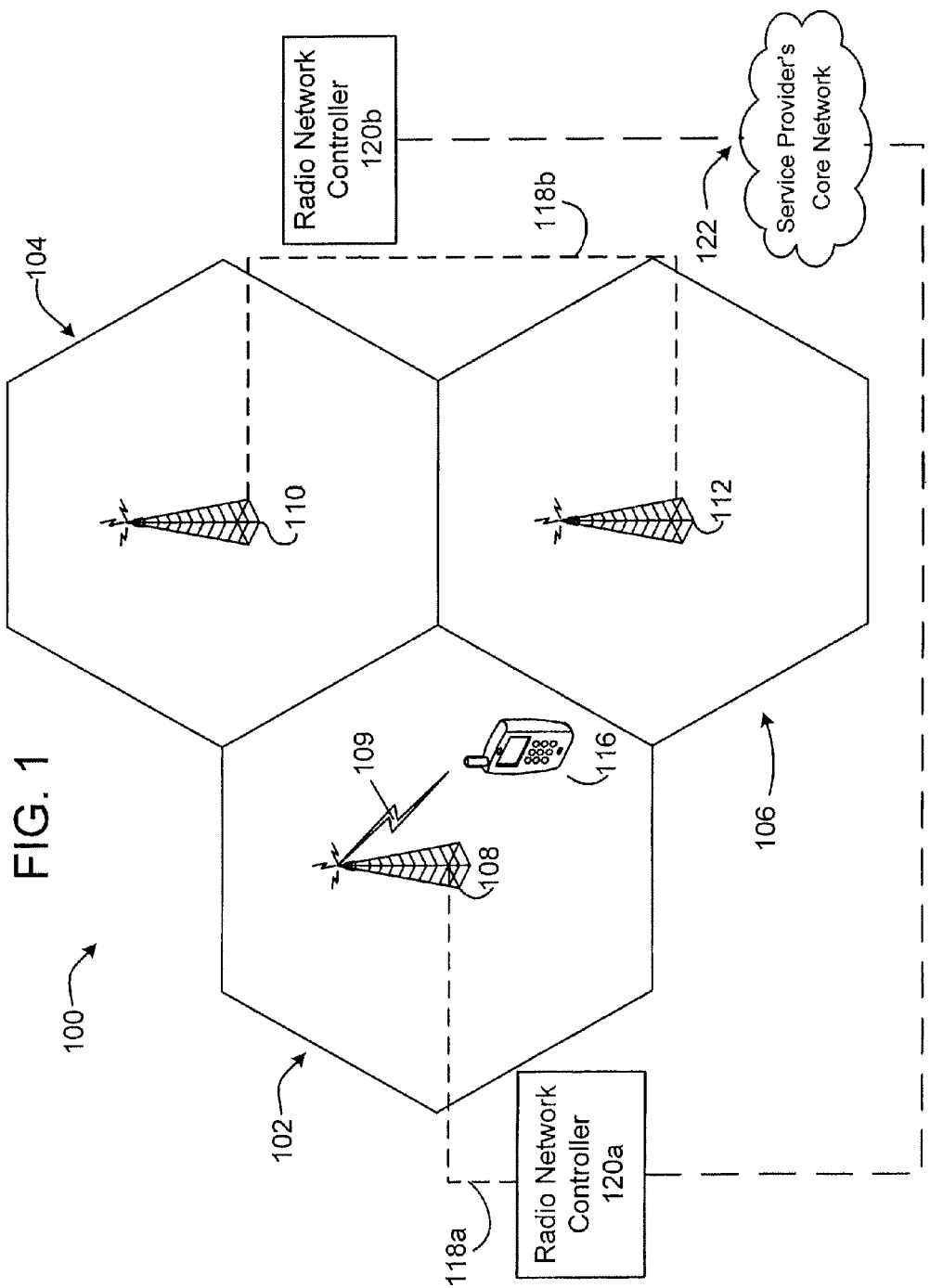
FIG. 1 is a diagram of a radio access network (RAN).

In wireless communication networks generally, the geographic areas served by access points, also referred to as "service areas," may vary in size, may include smaller service areas, and/or may be located within larger service areas. Larger geographic areas that include one or more smaller service areas are referred to as "macrocell areas," and an access point that serves a macrocell area is referred to as a "macrocell." Within a macrocell area, one or more access points may be located to serve smaller geographic areas, referred to as "femtocell areas." An access point that serves a femtocell area is referred to as a "femtocell access point" (FAP). A macrocell, for example, may provide coverage to an area of a few blocks, while a femtocell access point may provide coverage to a an area covering the interior or vicinity of a vehicle, or spanning a floor of a building, a house, or an office space.

Global System for Mobile communications/Wideband Code Division Multiple Access (GSM/WCDMA) wireless communication networks (e.g., 2G/3G macro networks) have been implemented and are in operation globally. However, one motivation for providing "femtocell access points" in such 2G/3G macro networks is that the coverage of those macro networks is often poor which may cause, e.g., service disruption (e.g., a dropped telephone call) to users of User Equipment (UEs) at home and inside buildings. Femtocell access points, also known as, e.g., "home" base stations, private access points, or simply "femtocells", provide complementary indoor coverage to 2G/3G macro networks for service continuity. Femtocell access point (FAP) implementations may also serve as a new service platform to enable mobile wireless broadband applications and home entertainment.

A private access point may include, for example, a femtocell access point or a picocell access point. A private access point may be installed anywhere, for example, a vehicle, a home, an office, a public space, or a restaurant. For ease of description, private access points will be described hereinafter as femtocell access points or FAPs. For communications between user equipments and access points generally, a call established between an access point and user equipment may be transferred to another access point in a process referred to as a "handoff". From the point of view of a particular access point, there are two types of hand-offs: a "hand-out" moves an in-progress call out to a neighboring access point (allowing the access point to free up its resources) and a "hand-in" occurs when a neighboring access point transfers an in-progress call into the access point (the access point needs to allocate resources to service the call).

A handoff may be performed for a variety of different reasons. Typically, a handoff occurs when an user equipment moves into a different coverage area. For example, a call that has been established with a macrocell may be transferred to a neighboring macrocell when the user equipment moves outside of the service area covered by the macrocell. A handoff may also occur when the capacity for connecting new calls to a particular macrocell is reached. In this scenario, the macrocell may transfer an existing call (or a new call) to another macrocell with overlapping coverage. Hand-offs between macrocells and femtocells may occur for similar/other reasons. A femtocell hand-in may occur when a user equipment determines that a neighboring femtocell can provide faster and/or more robust communications with the user equipment than can the macrocell. For example, the user equipment could be located in closer geographic proximity to the femtocell or there may be fewer obstructions in the communication path between the femtocell and the user equipment. Femtocell hand-in may occur whenever a femtocell signal is detected by the user equipment because it is operator policy to prefer femtocell usage over macrocell.

To facilitate a handoff, an user equipment identifies nearby macrocells or femtocells from information provided by the access point which is currently servicing the call. The information, collectively, is referred to as a "neighbor list" and includes scrambling codes assigned to neighboring macrocells and femtocells. The scrambling codes are used in WCDMA to separate transmissions from different access points sharing the same channel frequencies. A neighbor list may also include channel frequencies assigned to neighboring macrocells and femtocells.

In many hand-off processes, for example, a user equipment selects a scrambling code of a nearby access point from the neighbor list received from its current access point. The user equipment uses the scrambling code to decode a pilot signal that is continuously transmitted by the nearby access point in order to determine the quality of the communication channel between itself and that access point. For example, the user equipment can determine the signal-to-noise ratio, and the bandwidth of the communication channel. If the user equipment determines that the communication channel is of sufficient quality, it establishes communication with the nearby access point. Otherwise, the user equipment selects the scrambling code of a different access point from the neighbor list, tests the associated pilot signal, and repeats the process until a suitable access point is determined.

Referring to FIG. 1, a radio access network (RAN) 100 includes multiple macro access points or "macrocells" 108, 110, and 112 located in macrocell areas 102, 104, and 106, respectively. The macrocell areas 102, 104, and 106 can include one or more femtocell access points (FAPs). The macrocells 108, 110, and 112 are each configured to communicate with a user equipment over an airlink. For example, macrocell 108 communicates with user equipment (UE) 116 over an airlink 109. Macrocells 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

The RAN 100 is configured to support various mobile wireless access technologies, examples of which include Universal Mobile Telecommunications System (UMTS), Long Term Evolution (LTE) and Code Division Multiple Access (CDMA) 2000. The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication standards may also be used. Although this description uses terminology from the 3GPP's UMTS standards, the same concepts are applicable to other wireless communication standards, including CDMA 1xEV-DO, CDMA2000, WiMax, WiBro, WiFi, and the like.

The following sections of the 3GPP Standard are hereby incorporated by reference in their entireties:

3GPP Technical Specification 25.331 version 8.3.0 Release 8, 2008-07, Universal Mobile Telecommunications System (UMTS); Radio Resource Control (RRC); Protocol specification;

3GPP Technical Specification 25.304 version 7.6.0 Release 7, 2008-07, Universal Mobile Telecommunications System (UMTS); User Equipment (UE) procedures in idle mode and procedures for cell reselection in connected mode;

3GPP Technical Specification 25.133 version 8.3.0 Release 8, 2008-06, Universal Mobile Telecommunications System (UMTS); Requirements for support of radio resource management (FDD);

3GPP Technical Specification 24.008 version 7.9.0 Release 7, 2007-10, Digital cellular telecommunications system (Phase 2+); Universal Mobile Telecommunications System (UMTS); Mobile radio interface Layer 3 specification; Core network protocols; Stage 3; and 3GPP Technical Specification 23.122 version 7.9.0 Release 7, 2007-06, Digital cellular telecommunications system (Phase 2+); Universal Mobile Telecommunications System (UMTS); Non-Access-Stratus (NAS) functions related to Mobile Station (MS) in idle mode.

Figure 2:
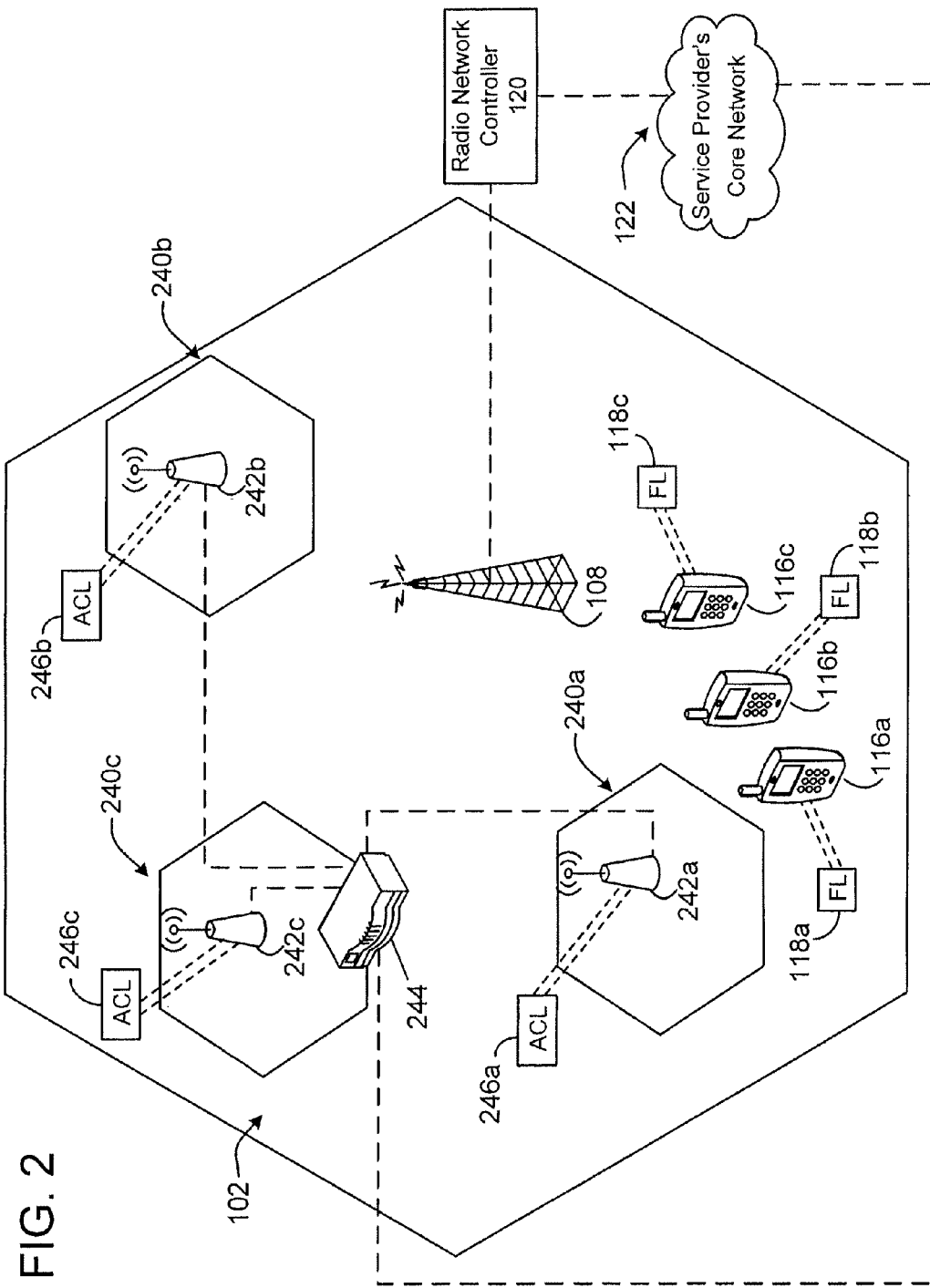
FIG. 2 is a diagram of a femtocell deployment within a macrocell area of the RAN of FIG. 1.

Referring to FIG. 2, it is diagram showing a femtocell deployment in the macrocell service area 102 of the RAN 100 of FIG. 1. The service area 102 of macrocell 108 includes femtocell areas 240a, 240b, and 240c served by femtocell access points (FAPs) 242a, 242b, and 242c, respectively. Hereinafter, the femtocell access points 242a, 242b, and 242c are referred to as "FAPs 242a, 242b, and 242c." Although, only three FAPs are shown in FIG. 2, in practice a macrocell area can include many more FAPs. For example, a macrocell area could include hundreds, thousands, or hundreds of thousands of FAPs.

A femtocell server 244 (or "network gateway"—see FIG. 3) is in communication with one or more of the FAPs 242a-c. The femtocell server 244 maintains active associations between user equipments such as user equipments (UEs) 116a, 116b, and 116c and the FAPs 242a-c so that a hand-in request from the macrocell 108 (or other components of the mobile core network) can be directed to the correct FAP. One or more of the FAPs 242a-c and the femtocell server 244 may be combined as a single device. In early deployment, the femtocell server 244 may present a similar, conventional system interface as that of RNC 120 to the existing core network infrastructure 122. References to the core network 122 may in some cases be a shorthand for a reference to the femtocell server 244, and in some implementations, certain functions of the core network 122 may be included in the femtocell server 244 and vice versa. For example, when reference is made to an FAP accessing stored information from the core network 122, all or part of the information might be stored on the core network 122 and/or the femtocell server 244.

Each of the FAPs 242a-c is generally configured to continuously transmit or broadcast a main pilot signal. The main pilot for an FAP is decoded with a main scrambling code assigned to that particular FAP. The terms "main scrambling code" and "main pilot" may also be referred to as "operating scrambling code" and "operating pilot," respectively. The FAPs' main scrambling codes may be assigned with maximum geographic dispersal in order to minimize radio interference probability (given that they may be reused within a macrocell area in a dense deployment). The main scrambling codes assigned to the FAPs 242a-c may be stored in the neighbor list of the macrocell 108.

Femtocell access point systems typically perform some type of closed access control. Closed access control can mean the access to each femtocell access point is limited in some fashion (e.g., not every user equipment may "camp" on the femtocell and/or utilize the services of the femtocell). For example, an owner of an FAP may wish to control which user equipments are allowed to camp on and register with the core network 122 via the FAP to use normal service (e.g., non-emergency service).

User equipments may be "authorized" or "not authorized" ("unauthorized") to camp on and/or use services of an FAP. Each FAP of the FAPs 242a-c may include an authorization list, or "access control list," which may be stored in memory on the FAP (see, e.g., access control lists (ACLs) 246a, 246b, 246c stored on respective FAPs 242a, 242b, 242c in FIG. 2). The access control list for a particular FAP includes identities of UEs that are authorized on that FAP. Access control lists may be updated periodically by an administrator or operator of the core network (e.g., the core network 122). UEs that are not identified on the access control list of a particular FAP are not authorized on that FAP. A particular UE may be authorized on one FAP and unauthorized on another FAP. From the perspective of an FAP, an UE is either an authorized user equipment (AUE) or an unauthorized user equipment (UUE). From the perspective of an UE, an FAP is either an authorized FAP (e.g., a "home" FAP that the UE is authorized on), or an unauthorized FAP (e.g., a "foreign" FAP that the UE is not authorized on).

A home FAP may be located in a user's home, in an office building, or in some other public or private location. Likewise, a "foreign" FAP may be located in close physical proximity to a user's home FAP but still be foreign from the perspective of the UE. Just as an FAP may identify more than one authorized UE in its access control list, an UE may be authorized on more than one FAP (and thus may have more than one authorized FAP or home FAP). For ease of description, a home FAP for an user equipment will be referred to as though it is the only home FAP for the user equipment.

Since an access control list of an FAP may change from time to time, a particular UE may change from being an authorized UE (AUE) at one point in time to being an unauthorized UE (UUE) for that FAP. Similarly, from the perspective of the "changing" UE, what was once an authorized FAP (e.g., a "home" FAP) when the UE was an AUE for that FAP, becomes an unauthorized FAP (e.g., a "foreign" FAP") when the UE becomes a UUE for that same FAP.

In portions of the following description, the UE 116a is referred to as being an authorized UE on the FAP 242a, and the FAP 242a is referred to as being a home FAP for, or from the perspective of, the UE 116a. At the same time, the UE 116a is referred to as being an unauthorized UE with respect to the FAP 242b, and the FAP 242b is referred to as being a foreign FAP for, or from the perspective of, the UE 116a. In analogous fashion, the UE 116b is referred to as being an authorized UE on the FAP 242b and an unauthorized UE on the FAP 242a. References to UEs 116a-c as authorized UEs and/or unauthorized UEs and FAPs 242a-c as home FAPs and/or foreign FAPs are merely examples. Thus, in some examples, the FAPs 242a, 242b, and 242c may be home FAPs for one or more UEs and may simultaneously be foreign FAPs for one or more other UEs. The UEs 116a-c may be authorized UEs for one or more FAPs and may simultaneously be unauthorized UEs for one or more other FAPs.

Examples of UE identifiers that may be used in an access control list on a particular FAP may include the International Mobile Subscriber Identity (IMSI) of the UE. While the UE may also use a temporary identifier such as a Temporary Mobile Subscriber Identity (TMSI) in initial communications with an FAP, access control lists may generally include the unique IMSI of the UE rather than the TMSI.

In a wireless network such as a UMTS network, each access point is assigned an access point identifier such as a Location Area Identifier. Location Area Identifiers are explained in more detail in 3GPP Technical Specification 23.003, section 4.4.4.6. The Location Area Identifier (LAI) of the access point is broadcast to UEs. When camping on an access point, the UE issues a Location Area Update Request message that contains the LAI assigned to that access point. That Location Area Update Request message is forwarded by the access point to the core network and the core network returns a message to the UE that allows that UE to camp on the access point to use normal service (e.g., non-emergency service) or that rejects the UE's Location Area Update Request to disable normal service (unless the UE is trying to make an emergency call from the FAP). Once camped on an access point with a particular LAI, the UE can move into the coverage area of another access point with the same LAI without issuing a new Location Area Update Request. The UE issues a new Location Area Update Request message when the UE moves into the coverage area of an access point with a different LAI. The UE may also issue the Location Area Update Request periodically to inform an access point that the UE is still in the vicinity of the access point.

A LAI is an example of an access point identifier. In some examples, wireless networks that use other air interface standards may use an access point identifier other than a LAI in access control.

When an UE moves into the coverage area of an FAP, the UE will generally issue a Location Area Update Request message containing the LAI assigned to that FAP. Thus, even an UE that is unauthorized on a particular FAP but that is in range of or in the coverage area of the FAP will generally attempt to camp on the FAP and do Location Area registration with the core network (e.g., core network 122) using the Location Area Update Request message. In order to support a form of closed access control, Location Area Update Request messages from unauthorized UEs should be rejected to prevent the unauthorized UEs from camping on the FAP to use normal service.

Figure 3:
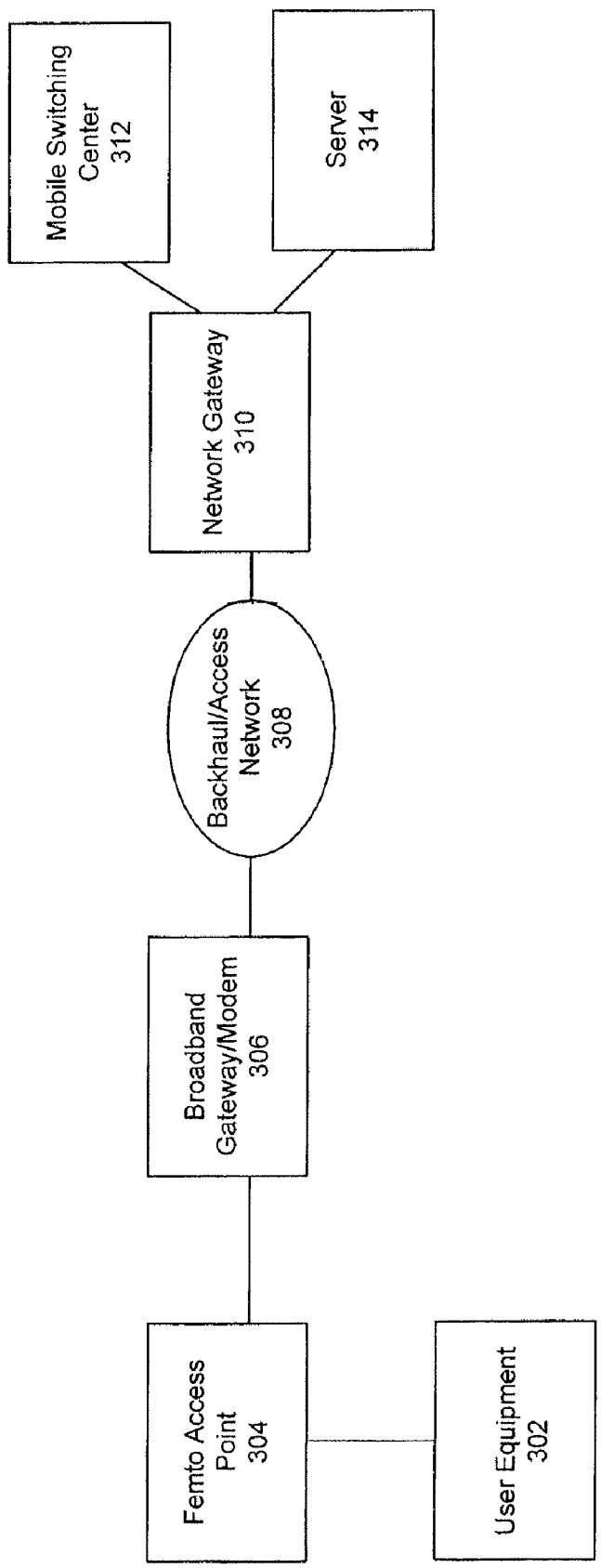
FIG. 3 is a diagram of an example network architecture

FIG. 3 is an example of a network architecture 300. In some examples, FAP 304 is in communication with user equipment 302, and forwards and receives traffic through the network gateway 310. Packets traverse the broadband gateway 306 and backhaul network 308. The backhaul network 308 can be based on DSL, cable, or similar access technologies. The FAP may be standalone or integrated with the broadband gateway 306. Clocks within different network components are synchronized by exchanging network time protocol (NTP) messages.

In some examples, the broadband backhaul bandwidth sets an upper limit on number of simultaneously supported high priority sessions. High priority sessions can include voice calls, video sessions, streaming packets, gaming packets, and collectively referred to as "high priority traffic") with adequate quality of service. Due to the asymmetric nature of some access networks such as DSL and cable, it is especially important to minimize the uplink bandwidth. In many cases, the bandwidth may vary over time (e.g., high priority traffic can be started or stopped on the broadband gateway 306), or may be unknown for a number of reasons (e.g., provisioned in the broadband modem; the mobile operator is not collaborating with the wireless operator; other non-femto traffic such as VoIP). As such, when a new call is received, the backhaul bandwidth can be the main constraint on both the quality of service and the volume of traffic.

The user or service provider may allocate all, or more typically a proportion of the bandwidth for use by high priority traffic. The queueing discipline (e.g. strict, weighted queuing) and whether or not to perform traffic shaping may be defined differently for the FAP 304 and the broadband gateway 306. Accordingly, it is useful for the FAP 304 to have the capability to perform NTP-based bandwidth estimation while supporting active calls, measure the bandwidth allocated for high-priority traffic (rather than the full backhaul link rate), and use NTP-based or RTCP-based bandwidth estimation in admission control decisions for new high-priority sessions. The FAP 304 can monitor backhaul bandwidth for high priority sessions without introducing an excessive amount of traffic overhead; that is, the techniques described herein allow FAP 304 to use existing multimedia and signaling communications in monitoring the backhaul bandwidth. Furthermore, FAP 304 can monitor backhaul bandwidth while supporting active sessions.

By performing admission control based on timely backhaul bandwidth estimates, the FAP can better determine whether it can support an additional call admission and avoid deteriorating quality of already admitted users. Since the actual usage by other active sources is measured, the FAP will have a real-time estimate of how much of the measured high-priority backhaul rate is available for new sessions. If a specific session is primarily unidirectional (on mute, or only one participant has a video camera), the FAP 304 will detect this and can allocate this bandwidth to an additional session requiring high priority bandwidth. If the backhaul does not provide differentiated quality of service (QoS) treatment of traffic, this will be detected and the low priority traffic can be appropriately throttled.

In some examples, the FAP 304 monitors the available uplink backhaul bandwidth for high priority uplink traffic by either periodically counting all high priority traffic and thereafter sending a time-stamped probe packet to a server 314 (e.g., a server that can apply a timestamp to a packet, such as an NTP server), or by receiving real time control protocol (RTCP) packets for active high priority sessions from the network gateway 310. When using the NTP-based probe packet method (described in greater detail below), the server 314 inserts its own time stamp into the packet and returns it to the FAP 304, which processes the packet for the purpose of bandwidth estimation, but does not use it to update the local clock. Additional high priority uplink traffic can be injected into the network at the FAP 304, the broadband gateway 306, and the backhaul/access network 308. It should be noted that although the methods described herein related to upstream monitoring of bandwidth by an FAP, similar methods can be used to monitor bandwidth in a downstream direction (e.g., FAP 304 would apply the timestamp to the probe packet, and the network gateway would perform the functions normally performed by FAP 304).

Figure 4:
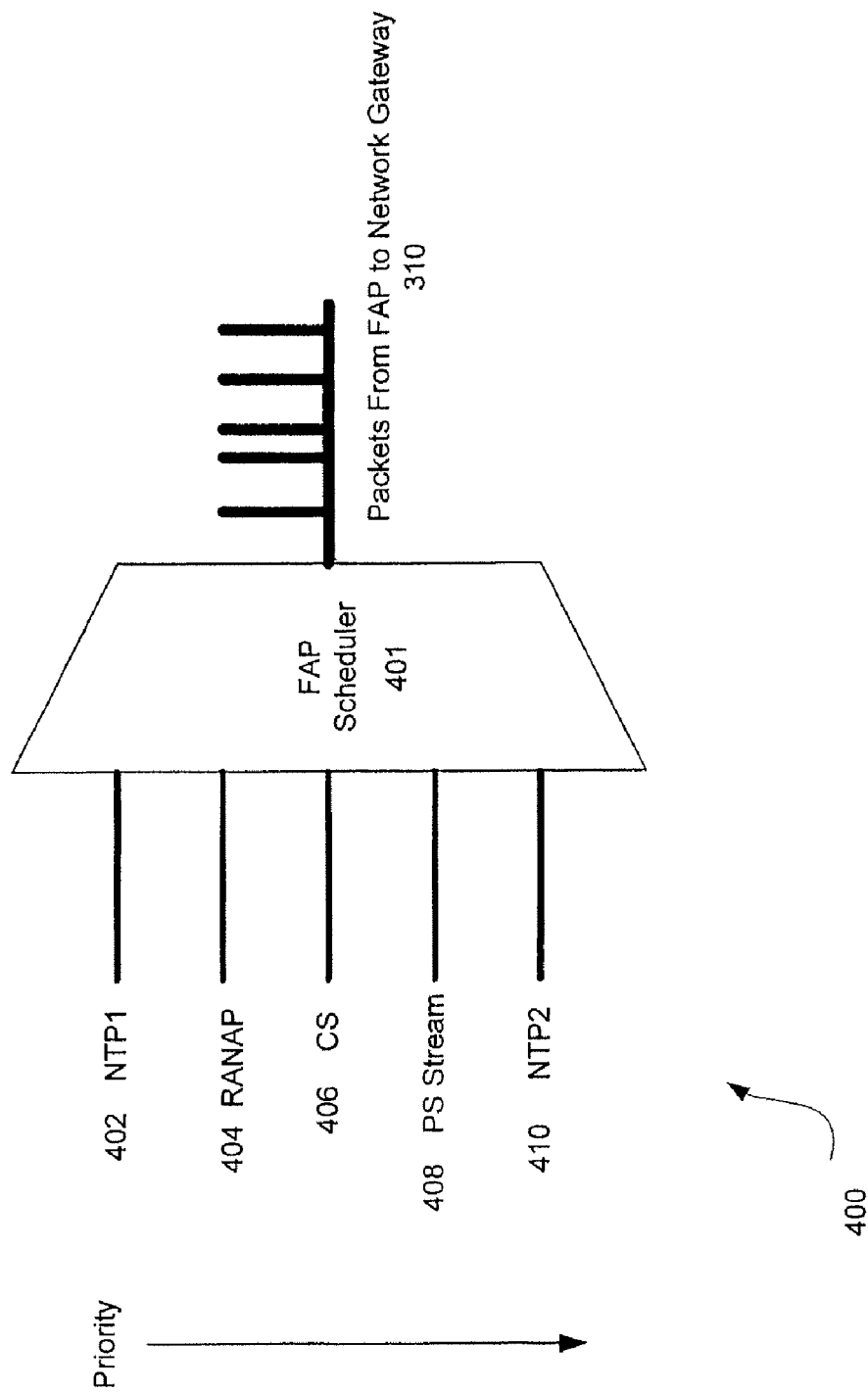
FIG. 4 is an exemplary traffic flow diagram.

In some examples, the bandwidth of the backhaul network can be estimated using an NTP-based probe packet method. FIG. 4 shows an example of a quality service aware backhaul packet scheduler 400. Traffic to be sent over the backhaul link is assigned to one of the priority queues. In the FIG. 5, queues are assigned for different high priority traffic. Additional queues (not shown) may be allocated for low-priority traffic. In some examples, the FAP 401 uses "probe" packets to measure the delay for the packets in the high-priority queues to arrive at a femto gateway (not shown). The FAP clock is synchronized by means of a separate set of NTP packets assigned to the highest priority queue 402. That is, packets allocated to the NTP 1 queue 402 are sent in infrequent batches (e.g., once per hour) at the highest priority for maintaining time and frequency stability. NTP1 in queue 402 can be part of the existing high priority traffic, or it can be a set of packets sent specifically to synchronize clocks within the network.

The FAP 401 sends a set of high priority packets (e.g., RANAP in queue 404 and CS in queue 406) immediately followed by a "probe" packet in NTP format in queue 410. The probe packet (NTP2 in queue 410) is transmitted periodically (e.g., once every two seconds). However, if FAP 304 is not currently servicing any high priority traffic, the probe packet is suppressed and not sent, or may be delayed until after a high priority packet arrives in any of the queues 404, or 406. The RANAP packet in queue 404 is a signaling protocol used to set up high priority traffic, while CS packet queue 406 contains voice or video traffic sent over a circuit switched radio bearer, and the PS streaming queue 408 contains streaming packets sent over a packet bearer. The server timestamp in the returned NTP packet is used to estimate the time it takes for the set of packets to arrive at the femto gateway.

There are a number of ways of estimating the number of bytes sent from the high-priority queue. Some examples assume that the FAP maintains a byte counter that is incremented for each uplink IP packet that the backhaul scheduler selects and sends. The byte estimator may include the overhead required to tunnel and encrypt packets sent to the network gateway. It is configurable whether the estimator for number of high-priority bytes sent includes the PPP, Ethernet and ATM overhead (the FAP scheduler doesn't consider this overhead when making decisions).

The FAP determines the time offset for the chosen server from the existing FAP NTP daemon used for time synchronization and frequency stability. If the time offset is not chosen in this manner, a separate dedicated NTP process is needed to determine the time offset, which would generate slightly more traffic.

The FAP records the time when it sends the first packet in a set of back-back high-priority packets and the resulting number of bytes (including packet overhead as described above, and the size of the probe packet), followed by a probe packet. The backhaul quality of service (QoS) scheduler may, for example, record the time it starts processing packets from the high-priority queues, estimate the number of bytes for each sent packet using a counter incremented for each packet, and update the NTP probe packet timestamp and send it as the last in the packet sequence.

The probe packet should be constructed by an application program, such that the QoS scheduler just has to insert a timestamp into a pre-defined template packet immediately before selecting it out of the queue and sending it. In some examples, the timestamp used for the probe packet takes in account that OS clock tick (e.g., clock interrupts) is not continuously updated.

Figure 5:
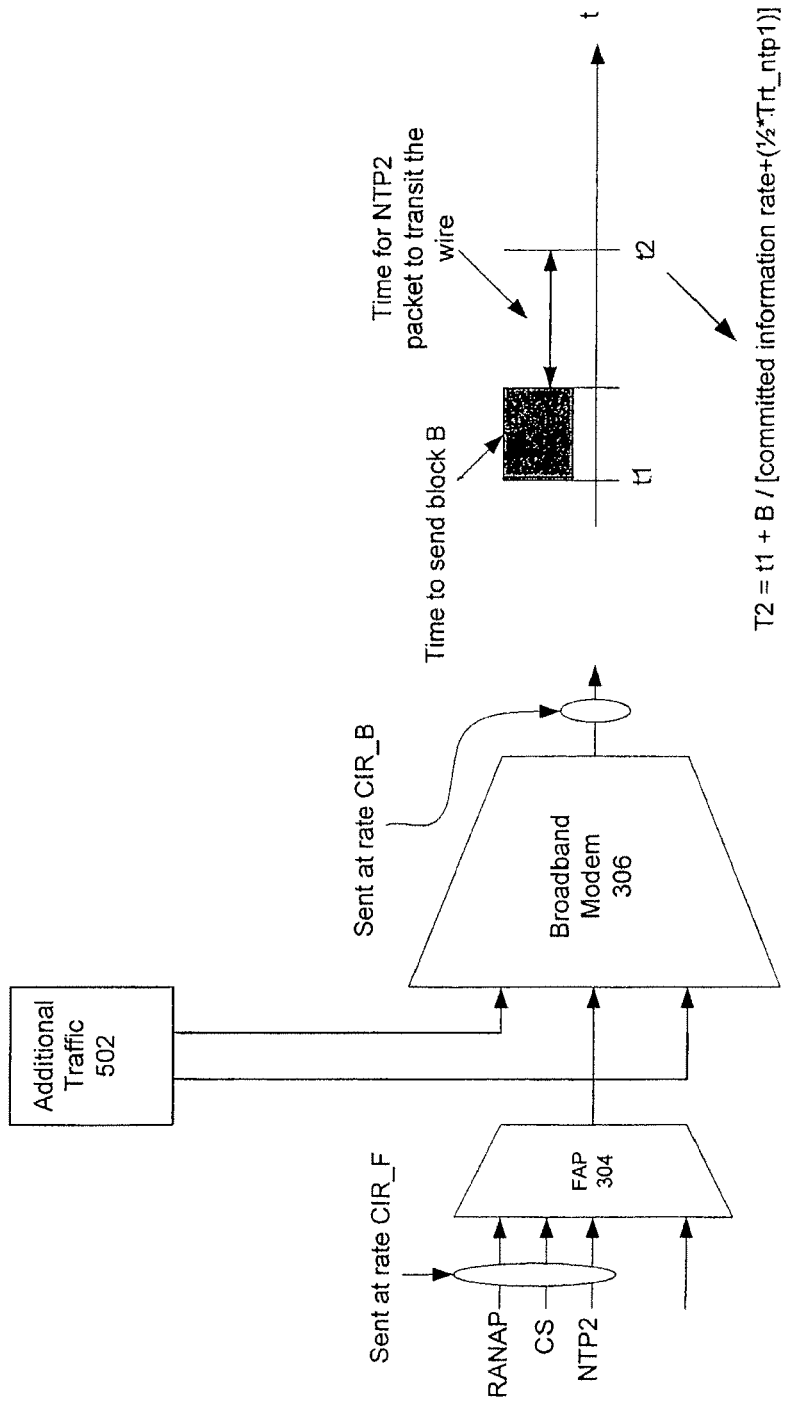
FIG. 5 illustrates an example calculation of available bandwidth.

FIG. 5 is an example of a way of calculating backhaul bandwidth using the NTP-based calculation method. This calculation can be used to obtain a metric in the form of bytes per second (bytes/sec) that can indicate available backhaul bandwidth. In some examples, the FAP synchronizes its internal clock using the first set of NTP packets (NTP1 402—see FIG. 4) sent to one or more servers. One of these servers is chosen to also receive the probe packets. The server 314 (FIG. 3) applies a timestamp to the second set of NTP packets ("probe" packets NTP2 410—see FIG. 4) and transmits the probe packets 410 back to the FAP. The FAP calculates the level of latency using the difference between the time at which the first high priority packet was transmitted, and the time at which the probe packets were timestamped by the server 314 and thereafter subtracts the time that the probe packet required to actually travel over the backhaul link and access network. The travel time is estimated by means of the travel time experienced by the packets sent in the NTP1 packet stream and may be an average obtained from several NTP packets or obtained from the FAP's NTP daemon. The FAP calculates the amount of backhaul bandwidth by dividing the size of the communication by the level of latency. Additional traffic 502 may be passing through broadband modem 306 (e.g., another user could be participating in a VoIP session directly with the broadband modem 306).

The FAP maintains time synchronization via NTP with time drift of less than, for example, 0.5 ms/hour. The absolute time accuracy (including known offset) should be less than 40 ms, depending on the network deployment. The FAP chooses the primary TR-069 provisioned server (such as server 314; see FIG. 3) as the target for "probe" packets sent for purpose of bandwidth estimation. If the server is unresponsive, the FAP may switch to using the next provisioned server.

The "probe" packets sent and received for the purpose of bandwidth estimation should not be included in the update of local system clock. The FAP 305 estimates the backhaul packet size for each uplink packet based on its packet length, the estimate taking into account any overhead due to IPsec tunnel mode, UDP encapsulation and crypto suite, Broadband backhaul type (PPPoE, PPPoA, Ethernet), and ATM AAL5 and 48-octet payload padding. The FAP 401 estimates the number of bytes sent over the backhaul link, i.e. including IPsec, PPP and Ethernet and/or ATM overhead, and uses this in its estimation of the backhaul bandwidth.

The "probe" packet can receive the same DSCP marking as other high-priority packets, and the backhaul QoS scheduler can include the "probe" traffic in the high priority profile bandwidth limit. Upon receipt of the probe packet response, the backhaul bandwidth can be calculated in a manner demonstrated by the following expression: Sum(high_priority_bytes sent during scheduler quantum)/(t_NTP_server-_timestamp-t_scheduler_start-t_clock_offset).

The FAP can use a sliding window average of multiple probe estimates (e.g., ten estimates) to improve the accuracy of the estimate. To calculate using estimates, the total number of bytes is added together and divided by sum of individual time periods.

The following definitions and algorithms relate to both FIG. 5 and the calculation of backhaul bandwidth ("CIR" represents committed information rate, which is the rate provisioned for high priority traffic):

Trt_ntp1=Avg round trip time for an NTP1 packet
t1=time at which first measured high priority packet is transmitted
t2=timestamp of NTP server (returned in NTP2 packet response)
CIR=min(CIR_F, CIR_B)
  CIR_F=FAP provisioned rate dedicated to high priority traffic
  CIR_B=Broadband modem rate dedicated to serving same high priority traffic (unknown)
  B=Total Bytes of data transmitted ahead of NTP2 packet (size calculated by FAP) CIR_estimated=B/(t2−t1−½*Trt_ntp1)

Once the amount of backhaul bandwidth has been calculated, the FAP can determine whether to admit new calls based on the monitored backhaul bandwidth. The bandwidth constraint can be imposed by the FAP itself, or by an upstream element such as the broadband gateway or the access network. The FAP can determine if it is the bottleneck by comparing the bandwidth estimate with its own provisioned or dynamic bandwidth limit allocated for high priority packets. It may use this knowledge to update its own limits, or to reduce the amount of lower priority packets it transmits. Backhaul bandwidth can be monitored and these calculations can be performed even while the FAP is supporting active sessions. If the FAP determines that the amount of available backhaul bandwidth is insufficient to support new high priority sessions, the FAP can reduce the amount of low priority communications (e.g., for cases where either the broadband gateway does not perform traffic prioritization, or it does not perform traffic shaping of high priority traffic). High priority calls are denied if either the average delay from the probe packet exceeds a predetermined threshold or if the call exceeds the available bandwidth.

In some examples, the bandwidth of the backhaul network can be estimated using an RTCP-based method. RTCP protocol is based on periodic transmissions of control packets by the remote participant in the session. It is a control protocol for RTP (Real time Transport Protocol) flow, making it possible to convey basic information on the participants of a session and the quality of service. RTP and RTCP make it possible to respectively transport and monitor data blocks which have real time properties. RTP and RTCP are protocols which are located at application level and use underlying UDP transport protocols. RTCP can be used to measure delay, jitter, and loss of real-time packet communications. The RTCP-based method of monitoring bandwidth estimates the ability of the network to support current high priority sessions with a high level of quality of service.

The RTCP-based approach extracts quality of service information from reports, and compares the values against provisioned thresholds, or against values obtained during periods of low traffic (e.g., while the FAP was supporting only one active session). As more traffic is added, the levels of jittery, delay, and packet loss will increase as the upper limit of the backhaul's bandwidth is approached. By comparing the quality of service information extracted from the RTCP reports, the FAP can determine whether sufficient bandwidth exists to support an additional high priority session.

Figure 6:
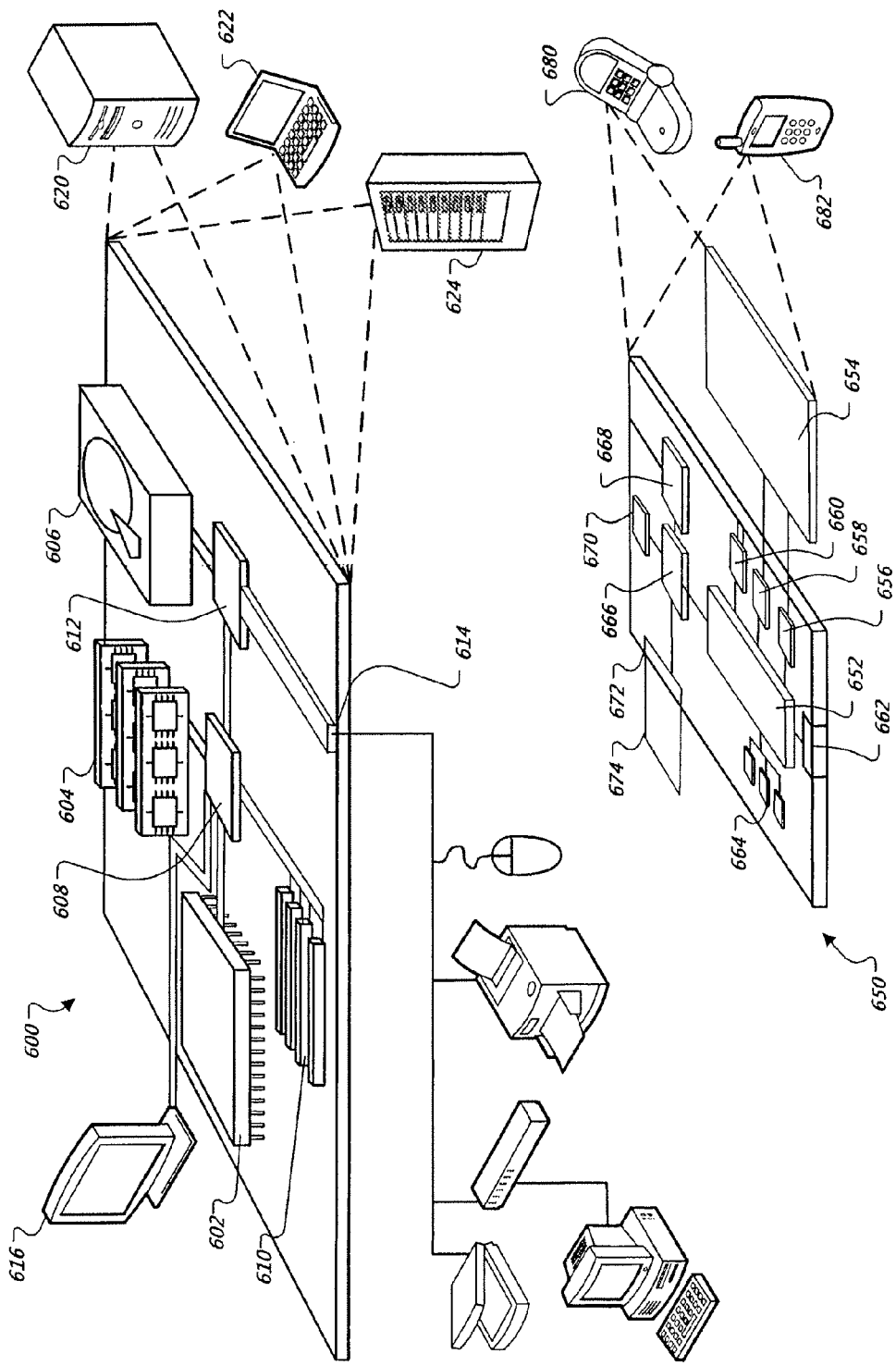
FIG. 6. is a block diagram of computing devices

FIG. 6 is a block diagram of computing devices 600, 650 that may be used to implement the systems and methods described in this document, either as a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units. The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or a memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650. Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method performed on a personal access point, the method comprising:
   transmitting, to a server, multimedia and signaling communications;
   transmitting, to the server immediately after the multimedia and signaling communications, a probe packet to be timestamped by the server; and
   monitoring, by the personal access point, an amount of backhaul bandwidth available for multimedia and signaling communications by measuring a level of latency associated with the multimedia and signaling communications, the measuring comprising:
   determining a difference between a time at which a first packet of the multimedia and signaling communications was first transmitted and the time at which the probe packet was timestamped by the server.

2. The method of claim 1, wherein the personal access point records or receives both a time at which the first packet in the multimedia and signaling communications is transmitted, and an amount of bits transmitted in the multimedia and signaling communications.

3. The method of claim 2, wherein the server applies a timestamp to the probe packet and transmits the probe packet back to the personal access point.

4. The method of claim 3, wherein the personal access point determines an amount of backhaul bandwidth by dividing the amount of bits transmitted in the multimedia and signaling communications by the level of latency.

5. The method of 3, wherein the personal access point determines an amount of backhaul bandwidth by dividing the total amount of bits transmitted during one or more measurement periods by the aggregate latency over the measurement periods.

6. The method of claim 1, wherein the personal access point determines whether to admit new sessions based on the backhaul bandwidth.

7. The method of claim 1, wherein the personal access point monitors the amount of backhaul bandwidth while supporting active sessions.

8. The method of claim 1, wherein the personal access point reduces an amount of low priority communications if the amount of backhaul bandwidth available for high priority communications is less than a predetermined amount.

9. The method of claim 1, wherein the bandwidth of the backhaul bandwidth is monitored in an upstream or a downstream direction.

10. A system comprising:
a personal access point configured to
transmit, to a server, multimedia and signaling communications;
transmit, to the server immediately after the multimedia and signaling communications, a probe packet to be timestamped by the server; and
monitor an amount of backhaul bandwidth available for multimedia and signaling communications by measuring a level of latency associated with existing multimedia and signaling communications, the measuring comprising:
determining a difference between a time at which a first packet of the multimedia and signaling communications was first transmitted and the time at which the probe packet was timestamped by the server.

11. The system of claim 10, wherein the personal access point records or receives both a time at which the first packet in the multimedia and signaling communications is transmitted, and an amount of bits transmitted in the multimedia and signaling communications.

12. The system of claim 11, wherein the server applies a timestamp to the probe packet and transmits the probe packet back to the personal access point.

13. The system of claim 12, wherein the personal access point determines an amount of backhaul bandwidth by dividing the amount of bits transmitted in the communications by the level of latency.

14. The system of 12, wherein the personal access point determines an amount of backhaul bandwidth by dividing the total amount of bits transmitted during one or more measurement periods by the aggregate latency over themeasurement periods.

15. The system of claim 10, wherein the personal access point determines whether to admit new sessions based on the monitored backhaul bandwidth.

16. The system of claim 10, wherein the personal access point monitors the amount of backhaul bandwidth while supporting active sessions.

17. The system of claim 10, wherein the personal access point can reduce an amount of low priority communications if the amount of backhaul bandwidth available for high priority communications is less than a predetermined amount.

18. The system of claim 10, wherein the bandwidth of the backhaul bandwidth is monitored in an upstream or a downstream direction.

19. A computer program product, tangibly embodied in a computer storage device, for executing instructions on a processor, the computer program product being operable to cause a machine to:
transmit, to a server, multimedia and signaling communications;
transmit, to the server immediately after the multimedia and signaling communications, a probe packet to be timestamped by the server; and
monitor by a personal access point, an amount of backhaul bandwidth available for multimedia and signaling communications by measuring a level of latency associated with existing multimedia and signaling communications, the measuring comprising:
determining a difference between a time at which a first packet of the multimedia and signaling communications was first transmitted and the time at which the probe packet was timestamped by the server.

20. The computer program product of claim 19, wherein the personal access point records or receives both a time at which the first packet in the multimedia and signaling communications is transmitted, and an amount of bits transmitted in the multimedia and signaling communications.

21. The computer program product of claim 20, wherein the server applies a timestamp to the probe packet and transmits the probe packet back to the personal access point.

22. The computer program product of claim 21, wherein the personal access point determines an amount of backhaul bandwidth by dividing the amount of bits transmitted in the multimedia and signaling communications by the level of latency.

23. The computer program product of 21, wherein the personal access point determines an amount of backhaul bandwidth by dividing the total amount of bits transmitted during one or more measurement periods by the aggregate latency over the same measurement periods.

24. The computer program product of claim 19, wherein the personal access point determines whether to admit new sessions based on the monitored backhaul bandwidth.

25. The computer program product of claim 19, wherein the personal access point monitors the amount of backhaul bandwidth while supporting active sessions.

26. The computer program product of claim 19, wherein the personal access point can reduce an amount of low priority communications if the amount of backhaul bandwidth available for high priority communications is less than a predetermined amount.

27. The computer program product of claim 19, wherein the bandwidth of the backhaul bandwidth is monitored in an upstream or a downstream direction.

* * * * *

UNITED STATES PATENT AND TRADEMARK OFFICE
CERTIFICATE OF CORRECTION

| | | |
|---|---|---|
| PATENT NO. | : 7,995,493 B2 | Page 1 of 1 |
| APPLICATION NO. | : 12/343445 | |
| DATED | : August 9, 2011 | |
| INVENTOR(S) | : Erik E. Anderlind | |

It is certified that error appears in the above-identified patent and that said Letters Patent is hereby corrected as shown below:

Column 14, Line 57, in Claim 5, after "of" insert -- claim --.

Column 15, Line 9, in Claim 10, delete "to" and insert -- to: --, therefor.

Column 15, Line 37, in Claim 14 after "of" insert -- claim --.

Column 15, Line 40, in Claim 14, delete "themeasurement" insert -- the measurement --.

Column 16, Line 33, in Claim 23, after "of" insert -- claim --.

Signed and Sealed this
Twenty-fifth Day of October, 2011

David J. Kappos
*Director of the United States Patent and Trademark Office*